(12) United States Patent
Sato et al.

(10) Patent No.: US 10,584,253 B2
(45) Date of Patent: Mar. 10, 2020

(54) LIGHT-CURABLE INKJET PRINTING INK COMPOSITION

(71) Applicant: SAKATA INX CORPORATION, Osaka-shi, Osaka (JP)

(72) Inventors: Yoichi Sato, Osaka (JP); Okinori Nakashima, Osaka (JP); Takuya Myose, Osaka (JP); Kazuhiro Fuke, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 16/072,178

(22) PCT Filed: Dec. 26, 2016

(86) PCT No.: PCT/JP2016/088622
§ 371 (c)(1),
(2) Date: Jul. 23, 2018

(87) PCT Pub. No.: WO2017/134962
PCT Pub. Date: Aug. 10, 2017

(65) Prior Publication Data
US 2019/0031895 A1 Jan. 31, 2019

(30) Foreign Application Priority Data

Feb. 5, 2016 (JP) .................. 2016-021260
Jul. 11, 2016 (JP) .................. 2016-136905

(51) Int. Cl.
| | |
|---|---|
| *C09D 11/101* | (2014.01) |
| *C09D 11/30* | (2014.01) |
| *B41M 5/00* | (2006.01) |
| *B41J 11/00* | (2006.01) |
| *C09D 11/106* | (2014.01) |
| *C09D 11/107* | (2014.01) |

(52) U.S. Cl.
CPC .......... *C09D 11/101* (2013.01); *B41J 11/002* (2013.01); *B41M 5/00* (2013.01); *B41M 5/0023* (2013.01); *C09D 11/106* (2013.01); *C09D 11/107* (2013.01); *C09D 11/30* (2013.01)

(58) Field of Classification Search
CPC . B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/1433; B41J 2/161; B41J 2/1623; B41J 2202/00; B41J 2202/03; B41J 2/14201; B41J 2/045; B41J 2/01; B41M 5/0011; B41M 5/0017; B41M 5/0047; B41M 7/00; B41M 7/0072; B41M 5/52; B41M 5/5218; B41M 5/025; B41M 5/03; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/00; B41N 10/00

IPC .................. B41J 11/002,2/2107; C09D 11/101
See application file for complete search history.

(56) References Cited

U.S. PATENT DOCUMENTS

| | | | |
|---|---|---|---|
| 2004/0126510 A1* | 7/2004 | Wood ..................... | B41M 5/52 106/31.43 |
| 2009/0124720 A1 | 5/2009 | Tsuchiya et al. | |
| 2011/0183081 A1* | 7/2011 | Nakane ................ | B41M 5/0023 427/511 |
| 2012/0270018 A1 | 10/2012 | Mizutani et al. | |
| 2013/0260092 A1* | 10/2013 | Araki ................... | C09D 11/101 347/102 |
| 2015/0175822 A1* | 6/2015 | Andre ................... | B41J 2/2114 347/102 |

(Continued)

FOREIGN PATENT DOCUMENTS

| | | |
|---|---|---|
| EP | 1911817 A1 | 4/2008 |
| EP | 2412769 A1 | 2/2012 |

(Continued)

OTHER PUBLICATIONS

Polymer Properties Database; pp. 1-6; CROW © 2015 polymerdatabase.com. Poly(caprolactum), Nylon 6; Tg: 51 degree C. (Year: 2015).*

(Continued)

*Primary Examiner* — Manish S Shah
(74) *Attorney, Agent, or Firm* — Law Offices of Katsuhiro Arai

(57) ABSTRACT

A light-curable inkjet printing ink composition contains a light-polymerizable component and a light-polymerization initiator, where the light-curable inkjet printing ink composition contains 70 to 100 percent by mass of monofunctional monomers relative to the total mass of the light-polymerizable component; wherein the monofunctional monomers comprise: (A) a monofunctional monomer whose homopolymer has a glass transition temperature of 20° C. or above; and (B) a monofunctional monomer whose homopolymer has a glass transition temperature of below 20° C.; and (A) is contained by 30 to 90 percent by mass, while (B) is contained by 10 to 70 percent by mass, relative to the total mass of the light-polymerizable component.

12 Claims, No Drawings

(56) References Cited

U.S. PATENT DOCUMENTS

| | | | |
|---|---|---|---|
| 2015/0274995 A1* | 10/2015 | Dain | C09D 11/02 347/20 |
| 2015/0353751 A1 | 12/2015 | Umebayashi | |
| 2015/0368493 A1 | 12/2015 | Yamada | |
| 2016/0347959 A1* | 12/2016 | Goi | B41J 2/01 |

FOREIGN PATENT DOCUMENTS

| | | |
|---|---|---|
| EP | 2441808 A1 | 4/2012 |
| EP | 2848660 A1 | 3/2015 |
| EP | 2949710 A1 | 12/2015 |
| JP | 2011052107 A | 3/2011 |
| JP | 2012067178 A | 4/2012 |
| JP | 2012116934 A | 6/2012 |
| JP | 2012158638 A | 8/2012 |
| JP | 2013227515 A | 11/2013 |
| JP | 2016172841 A | 9/2016 |
| JP | 2016210951 A | 12/2016 |
| WO | 2010143738 A1 | 12/2010 |

OTHER PUBLICATIONS

Notification Concerning Transmittal of International Preliminary Report on Patentability (PCT/IB326) and Notification of Transmittal of Translation of the International Preliminary Report on Patentability (PCT/IB/338) dated Aug. 16, 2018, with International Preliminary Report on Patentability (PCT/IB/373) and Written Opinion of the International Searching Authority (PCT/ISA/237), for corresponding international application PCT/JP2016/088622.
International Search Report (ISR) dated Feb. 7, 2017, issued for International application No. PCT/JP2016/088622.
Extended European Search Report (EESR) dated Sep. 6, 2019, issued for European counterpart patent application No. EP16889445.9 (7 pages).

* cited by examiner

LIGHT-CURABLE INKJET PRINTING INK COMPOSITION

This application is the U.S. National Phase under 35 U.S.C. § 371 of International Application PCT/JP2016/088622, filed Dec. 26, 2016, which claims priority to Japanese Patent Application No. 2016-021260, filed Feb. 5, 2016, and No. 2016-136905, filed Jul. 11, 2016. The International Application was published under PCT Article 21(2) in a language other than English.

TECHNICAL FIELD

The present invention relates to a light-curable inkjet printing ink composition and an inkjet printing method. More specifically, it relates to a light-curable inkjet printing ink composition characterized by good curability under ultraviolet light from a light-emitting diode (LED) light source, good adhesion to a polyvinyl chloride sheet, etc., and good flexibility of the coating film of ink.

BACKGROUND ART

Lately the inkjet recording method is increasingly used in the production of large-scale outdoor advertisements, etc., requiring a large image area. For the base materials of these advertisements, etc., polyvinyl chloride sheets that are tough enough to withstand outdoor use, such as pure polyvinyl chloride resin sheets, tarpaulin sheets made of composite materials, and the like, are used. And, light-curable inkjet printing ink compositions free from volatile components are proposed as inkjet printing inks used for printing on these polyvinyl chloride sheets.

To make the aforementioned outdoor advertisements, etc., weather-resistant, not only the base material, but also the ink compositions, must be able to form a tough film. However, light-curable materials capable of forming a tough film tend to exhibit a lower adhesion to the base material because the film is generally very hard. Accordingly, a method of using an ink that contains, in part, a component to dissolve the base material is adopted to improve the adhesion of these ink compositions to the base material. For example, an active-energy beam-curable inkjet ink for polyvinyl chloride sheet, which contains, at a specific ratio, an ethylenic double bond-containing compound that does not dissolve polyvinyl chloride, and an ethylenic double bond-containing compound that dissolves polyvinyl chloride (N-vinyl caprolactam), is proposed (refer to Patent Literature 1).

However, a printed matter manufactured using such inkjet ink presents a problem in that, although the ink adheres well to the polyvinyl chloride sheet, cockling (phenomenon of the base material deflecting) occurs easily.

Also, use of a metal halide lamp or other traditionally and commonly used high-energy light source to cure images presents such problems as production of ozone, increase in the size of the irradiation equipment, shortening of the service life of the lamp, and the like. For these reasons, low-energy light-emitting diode (LED) lamps are used as light sources in recent years. This gives rise to requirements for curability, printability (adhesion, improvement of cockling, etc.) and safety (flash point, irritability, etc.) under low-energy LED lamps, and therefore light-curable inkjet printing ink compositions that can meet these requirements are proposed.

Among these light-curable inkjet printing ink compositions proposed are, for example, a light-curable inkjet printing ink composition that contains a pigment, benzyl acrylate, N-vinyl caprolactam, acrylated amine compound having two light-polymerizable function groups in the molecule and two amino groups in the molecule, and sensitizer (refer to Patent Literature 2), and a light-curable inkjet printing ink composition that contains a pigment, a compound containing (meth)acrylate and vinyl ether groups in a specific quantity of molecules, and a specific quantity of vinyl caprolactam (refer to Patent Literature 3).

However, these methods use a polyfunctional polymerizable compound in a large quantity and therefore produce a hard coating film of ink that tends to adhere poorly to the printing base material.

BACKGROUND ART LITERATURE

Patent Literature

Patent Literature 1: Japanese Patent Laid-open No. 2012-158638
Patent Literature 2: International Patent Laid-open No. 2010/143738
Patent Literature 3: Japanese Patent Laid-open No. 2012-116934

SUMMARY OF THE INVENTION

Problems to be Solved by the Invention

Accordingly, an object of the present invention is to provide a light-curable inkjet printing ink composition characterized by good curability in thin film form under ultraviolet light, particularly ultraviolet light from a light-emitting diode (LED) light source, good adhesion to a polyvinyl chloride sheet, etc., and good flexibility of the coating film of ink.

Means for Solving the Problems

After studying in earnest to achieve the aforementioned object, the inventors completed the present invention after discovering that the object could entirely be achieved by a light-curable inkjet printing ink composition that contains specific quantities of monofunctional monomers as a light-polymerizable component, wherein the monofunctional monomers comprise:
(A) a monofunctional monomer whose homopolymer has a glass transition temperature of 20° C. or above; and
(B) a monofunctional monomer whose homopolymer has a glass transition temperature of below 20° C.; and
(A) and (B) are contained by specific quantities relative to the total mass of the light-polymerizable component.

To be specific, the present invention is (1) a light-curable inkjet printing ink composition that contains a light-polymerizable component and a light-polymerization initiator, where the light-curable inkjet printing ink composition contains 70 to 100 percent by mass of monofunctional monomers relative to the total mass of the light-polymerizable component; wherein the monofunctional monomers comprise:
(A) a monofunctional monomer whose homopolymer has a glass transition temperature of 20° C. or above; and
(B) a monofunctional monomer whose homopolymer has a glass transition temperature of below 20° C.; and
(A) is contained by 30 to 90 percent by mass, while (B) is contained by 10 to 70 percent by mass, relative to the total mass of the light-polymerizable component.

Also, the present invention is (2) a light-curable inkjet printing ink composition according to (1) above, wherein (A) is one or more of acrylamide monomer, N-vinyl caprolactam, cyclic trimethylol propane formal acrylate, and isobornyl acrylate.

Also, the present invention is (3) a light-curable inkjet printing ink composition according to (1) or (2) above, wherein (A) contains an acrylamide monomer and a N-vinyl caprolactam, and the acrylamide monomer is contained by 5 percent by mass or more, and the N-vinyl caprolactam is contained by 5 percent by mass or more, relative to the total mass of the light-polymerizable component.

Also, the present invention is (4) a light-curable inkjet printing ink composition according to any one of (1) to (3) above, wherein (B) is one or more of benzyl acrylate, 2-phenoxy ethyl acrylate, ethylene oxide-added monomer of 2-phenoxy ethyl acrylate, cyclohexyl acrylate, ethyl carbitol acrylate, and tetrahydrofurfuryl acrylate.

Also, the present invention is (5) a light-curable inkjet printing ink composition according to any one of (1) to (4) above, wherein at least one of ethyl carbitol acrylate or tetrahydrofurfuryl acrylate is included in the (B) monofunctional monomer whose homopolymer has a glass transition temperature of below 20° C., and is contained by 0 to 30 percent by mass relative to the total mass of the light-polymerizable component.

Also, the present invention is (6) an inkjet printing method that uses a light-curable inkjet printing ink composition according to any one of (1) to (5) above, wherein the light-curable inkjet printing ink composition is attached to a recording medium, and the attached light-curable inkjet printing ink composition is irradiated with ultraviolet light, from a light-emitting diode light source, having an emission peak wavelength in a range of 350 to 420 nm.

Effects of the Invention

The present invention is a light-curable inkjet printing ink composition which, because of its specific formulation, can exhibit marked effects of excellent curability in thin film form under ultraviolet light, particularly ultraviolet light from a light-emitting diode (LED) light source, excellent adhesion to a polyvinyl chloride sheet, etc., and excellent flexibility of the coating film of ink.

MODE FOR CARRYING OUT THE INVENTION

The light-curable inkjet printing ink composition proposed by the present invention (hereinafter also referred to "ink composition proposed by the present invention") is explained in detail below.

It should be noted that, under the present invention, the below-mentioned ultraviolet light from a light-emitting diode (LED) light source is defined as "light irradiated from a light-emitting diode that generates ultraviolet light whose emission peak wavelength is in a range of 350 to 420 nm."

The ink composition proposed by the present invention contains at least a light-polymerizable component and a light-polymerization initiator.

<Light-Polymerizable Component>

The ink composition proposed by the present invention contains 70 to 100 percent by mass of monofunctional monomers relative to the total mass of the light-polymerizable component, and the monofunctional monomers comprise: (A) a monofunctional monomer whose homopolymer has a glass transition temperature of 20° C. or above; and (B) a monofunctional monomer whose homopolymer has a glass transition temperature of below 20° C.

Because (A) is contained in the light-polymerizable component, the light curability of the ink can be enhanced regardless of whether polyfunctional monomers are not used or used by a small quantity. Also, because (B) is contained in the light-polymerizable component, the coating film of ink becomes flexible and adheres well to the printing base material.

Examples of (A) include stearyl (meth)acrylate, isobornyl (meth)acrylate, cyclic trimethylol propane formal (meth) acrylate, adamantyl (meth)acrylate, dicyclopentanyl (meth) acrylate, dicyclopentenyl (meth)acrylate, styrene, acryloyl morpholine and various other (meth)acrylamide monomers, as well as N-vinyl caprolactam and other N-vinylamide monomers, and the like. Any one of the foregoing may be used alone, or two or more of them may be combined as necessary.

Among these, containing one or more of acrylamide monomer, N-vinyl caprolactam, cyclic trimethylol propane formal acrylate and isobornyl acrylate is desirable in achieving better curability and adhesion of the coating film, while it is more preferable to contain an acrylamide monomer and a N-vinyl caprolactam in such a way that the acrylamide monomer is contained by 5 percent by mass or more, and the N-vinyl caprolactam is contained by 5 percent by mass or more, relative to the total mass of the light-polymerizable component.

The content of (A) is 30 to 90 percent by mass, or preferably 35 to 85 percent by mass, or more preferably 40 to 65 percent by mass, relative to the total mass of the light-polymerizable component. If the content of (A) is less than 30 percent by mass, a printed matter constituted using the light-curable inkjet printing ink composition proposed by the present invention tends to have lower curability in thin film form; if the content exceeds 90 percent by mass, on the other hand, the coating film of ink of the light-curable inkjet printing ink composition proposed by the present invention tends to have lower adhesion to the printing base material.

Examples of (B) include benzyl acrylate, 2-phenoxy ethyl acrylate, ethylene oxide-added monomer of 2-phenoxy ethyl acrylate, cyclohexyl acrylate, ethyl carbitol acrylate, tetrahydrofurfuryl acrylate, 2-methoxy ethyl acrylate, polyethylene glycol (meth)acrylate, isoamyl acrylate, lauryl acrylate, hydroxy methyl acrylate, hydroxy ethyl acrylate, hydroxy propyl acrylate, hydroxy butyl acrylate, hydroxy phenoxy propyl acrylate, butyl acrylate, isobutyl acrylate, tertiary butyl acrylate, isostearyl acrylate, (2-methyl-2-ethyl-1,3-dioxolane-4-yl) methyl acrylate, (3-ethyl oxetane-3-yl) methyl methacrylate, and the like. Any one of the foregoing may be used alone, or two or more of them may be combined as necessary.

Among these, use of one or more of benzyl acrylate, 2-phenoxy ethyl acrylate, ethylene oxide-added monomer of 2-phenoxy ethyl acrylate, cyclohexyl acrylate, ethyl carbitol acrylate, and tetrahydrofurfuryl acrylate is desirable in achieving better flexibility of the cured film.

One or more of ethyl carbitol acrylate and tetrahydrofurfuryl acrylate is/are contained by preferably 0 to 30 percent by mass, or more preferably 3.0 to 7.0 percent by mass, relative to the total mass of the light-polymerizable component. When their content is 0 to 30 percent by mass, a cured film having superior flexibility can be achieved.

It should be noted that "0 percent by mass" means that neither ethyl carbitol acrylate nor tetrahydrofurfuryl acrylate is contained.

The content of (B) is 10 to 70 percent by mass, or preferably 15 to 65 percent by mass, or more preferably 50 to 60 percent by mass, relative to the total mass of the light-polymerizable component. If the content of (B) is less than 10 percent by mass, a coating film of ink constituted using the light-curable inkjet printing ink composition proposed by the present invention tends to become less flexible; if the content exceeds 70 percent by mass, on the other hand, the coating film of ink of the light-curable inkjet printing ink composition proposed by the present invention tends to have lower curability.

Additionally, the light-polymerizable component constituting the light-curable inkjet printing ink composition proposed by the present invention may be combined with any polyfunctional monomer or monofunctional or polyfunctional oligomer or polymers or other light-polymerizable component, besides the specific monomers and light-polymerizable components mentioned above, by a quantity that does not lower the performance of the present invention. For such other light-polymerizable component, any monomer, prepolymer, oligomer, etc., may be used without limitation, so long as it is an ethylenic double bond-containing compound.

Examples of such other polymerizable components include ethylene glycol di(meth)acrylate, propane diol di(meth)acrylate, butane diol di(meth)acrylate, hexane diol di(meth)acrylate, dipropylene glycol di(meth)acrylate, tripropylene glycol di(meth)acrylate, and other (poly)alkylene glycol di(meth)acrylates, trimethylol propane tri(meth)acrylate and ethylene oxide-modified products thereof, pentaerythritol tetra(meth)acrylate and ethylene oxide-modified products thereof, dipentaerythritol penta(meth)acrylate and ethylene oxide-modified products thereof, dipentaerythritol hexa(meth)acrylate and ethylene oxide-modified products thereof, urethane (meth)acrylate, epoxy (meth)acrylate, polyester (meth)acrylate, and the like. Any one of these other light-polymerizable components may be used alone, or two or more of them may be combined as necessary.

<Light-Polymerization Initiator>

The light-curable inkjet printing ink composition proposed by the present invention contains a light-polymerization initiator.

For the light-polymerization initiator, an acylphosphine oxide-based light-polymerization initiator (compound) that expresses initiator function when exposed to light with a wavelength of 300 to 450 nm, is preferred. It should be noted that "expresses initiator function when exposed to light with a wavelength of 300 to 450 nm" means exhibiting light absorption characteristics over the entire wavelength range of 300 to 450 nm. By using such acylphosphine oxide-based light-polymerization initiator, LED curability can further be added to the light-curable inkjet printing ink composition proposed by the present invention.

Specific examples include 2,4,6-trimethyl benzoyl-diphenyl-phosphine oxide (product name: TPO, manufactured by Lambson), bis(2,4,6-trimethyl benzoyl)-phenyl phosphine oxide (product name: IRGACURE819, manufactured by BASF), and the like.

The content of any such acylphosphine oxide-based light-polymerization initiator is preferably 3 to 25 percent by mass, or more preferably 5 to 15 percent by mass, relative to the total mass of the light-polymerizable component. If the content of the acylphosphine oxide-based light-polymerization initiator is less than 3 percent by mass, curability may not be sufficient. If the content exceeds 25 percent by mass, on the other hand, the storage stability of the light-curable inkjet printing ink composition proposed by the present invention decreases.

<Sensitizer>

The light-curable inkjet printing ink composition proposed by the present invention may further combine and use a light sensitizer (compound) exhibiting light absorption characteristics over a range of ultraviolet light wavelengths of primarily 400 nm or higher and expressing sensitization function to cause curing reaction when exposed to light of wavelengths in this range, in order to promote the curability under ultraviolet light from a light-emitting diode (LED) light source.

It should be noted that "expressing sensitization function when exposed to light of wavelengths of 400 nm or higher" means exhibiting light absorption characteristics over a wavelength range of 400 nm or higher. By using such sensitizer, the LED curability of the light-curable inkjet printing ink composition proposed by the present invention can be promoted.

The sensitizer is an anthracene-base sensitizer, thioxanthone-based sensitizer, etc., but preferably a thioxanthone-based sensitizer. Any one of the foregoing may be used alone, or two or more of them may be combined.

Specific examples include, among others, 9,10-dibuthoxy anthracene, 9,10-diethoxy anthracene, 9,10-dipropoxy anthracene, 9,10-bis(2-ethyl hexyl oxy) anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include DBA and DEA (manufactured by Kawasaki Kasei Chemicals) and the like for anthracene-based sensitizers, and DETX and ITX (manufactured by Lambson) and the like for thioxanthone-based sensitizers.

The content of the sensitizer is preferably in a range of 0 to 8 percent by mass relative to the total mass of the light-polymerizable component. Adding the sensitizer by more than 8 percent by mass is excessive and does not improve the effects at all, which is not desirable.

It should be noted that, if a thioxanthone-based sensitizer is used, the light-curable inkjet printing ink composition tends to become yellower and may assume a more yellowish hue than the color based on the pigment (inherent hue); therefore, preferably the content of the thioxanthone-based sensitizer is determined for each color as deemed appropriate.

Specifically, in the case of a white ink composition or clear ink composition affected more by a change in tone, preferably its sensitizer does not contain any thioxanthone compound. Additionally, in the case of a magenta ink composition or cyan ink composition that presents a problem if the hue changes, preferably a sensitizer is used to the extent that it does not cause a problem with the hue. Moreover, in the case of a black ink composition or yellow ink composition whose hue is not affected by discoloration and whose light-polymerizability is lower than compositions of other hues, preferably a thioxanthone-based compound is combined and used as a sensitizer.

<Colorant>

The light-curable inkjet printing ink composition proposed by the present invention may be blended with a colorant of each hue to obtain a light-curable inkjet printing ink composition of each color.

For such colorant, any pigment or dye traditionally used with standard light-curable inkjet printing ink compositions can be used without limitation; when light resistance is considered, however, pigments such as organic pigments or inorganic pigments are preferred.

Organic pigments include, for example, dye rake pigments and azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthrone-based, quinophthalone-based, pyranthrone-based, indanethrone-based pigments, and the like. Inorganic pigments include carbon black, titanium oxide, red iron oxide, graphite, iron black, chromium oxide green, aluminum hydroxide, and the like.

Also, specific examples of pigments for the light-curable inkjet printing ink composition proposed by the present invention, are specified below for each representative hue.

First, yellow pigments for using the light-curable inkjet printing ink composition as a yellow ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, and the like, of which preferred pigments include C. I. Pigment Yellow 150, 155, 180, 213, and the like.

Magenta pigments for using the light-curable inkjet printing ink composition as a magenta ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, and the like, of which preferred pigments include C. I. Pigment Red 122, 202, C. I. Pigment Violet 19, and the like.

Cyan pigments for using the light-curable inkjet printing ink composition as a cyan ink composition include, for example, C. I. Pigment Blue 1, 2, 3, 15, 15:1, 15:2, 15:3, 15:4, 15:6, 16, 18, 22, 27, 29, 60, and the like, of which preferred pigments include C. I. Pigment Blue 15:4 and the like.

Black pigments for using the light-curable inkjet printing ink composition as a black ink composition include, for example, carbon black (C. I. Pigment Black 7) and the like.

White pigments for using the light-curable inkjet printing ink composition as a white ink composition include, for example, titanium oxide, aluminum oxide, and the like, of which preferred pigments include titanium oxides that have been surface-treated with various materials such as alumina and silica.

The content of the colorant in the light-curable inkjet printing ink composition proposed by the present invention is preferably 1 to 20 percent by mass relative to the total quantity of the light-curable inkjet printing ink composition. If the content of the pigment is less than 1 percent by mass, the image quantity of the obtained printed matter tends to drop. If the content exceeds 20 percent by mass, on the other hand, the viscosity characteristics of the light-curable inkjet printing ink composition tend to be negatively affected.

<Pigment Dispersant>

Also, the light-curable inkjet printing ink composition proposed by the present invention may contain a pigment dispersant as necessary.

For the pigment dispersant, which is used to improve the dispersibility of the pigment and the storage stability of the ink composition proposed by the present invention, any of traditionally used pigment dispersants can be used without limitation; among these, however, preferably polymeric dispersants are used. These pigment dispersants include carbodiimide-based dispersants, polyester amine-based dispersants, aliphatic amine-based dispersants, modified polyacrylate-based dispersants, modified polyurethane-based dispersants, multiple-chain polymeric nonionic dispersants, polymeric ion active agents, and the like. Any one of these pigment dispersants may be used alone or two or more of them may be mixed.

Preferably the pigment dispersant is contained by 1 to 200 parts by mass when the total quantity of pigment used represents 100 parts by mass. If the content of the pigment dispersant is less than 1 part by mass, the pigment dispersibility and the storage stability of the ink composition proposed by the present invention may drop. On the other hand, while the pigment dispersant may be contained by more than 200 parts by mass, doing so may not make any difference in effects. A more preferable lower limit, and a more preferable upper limit, of the content of the pigment dispersant, are 5 parts by mass and 60 parts by mass, respectively.

<Surface-Active Agent>

Preferably the light-curable inkjet printing ink composition proposed by the present invention contains, according to the inkjet head used, any of silicon-based surface-active agents or other surface-active agents traditionally used as surface-active agents in light-curable inkjet printing ink compositions, in order to improve the discharge stability.

Specific examples of silicon-based surface-active agents include polyether-modified silicone oil, polyester-modified polydimethyl siloxane, polyester-modified methyl alkyl polysiloxane, and the like. Any one of the foregoing may be used alone, or two or more of them may be combined.

The content of the surface-active agent in the ink composition proposed by the present invention is preferably 0.005 to 1.0 percent by mass in the light-curable inkjet printing ink composition. If the content is less than 0.005 percent by mass, the surface tension of the light-curable inkjet printing ink composition proposed by the present invention increases and its discharge stability from the inkjet head drops. If the content exceeds 1.0 percent by mass, on the other hand, bubbles in the light-curable inkjet printing ink composition increase and the discharge stability drops as a result.

<Additives>

If necessary, various additives may be added to the light-curable inkjet printing ink composition proposed by the present invention, to express various functionalities. To be specific, such additives include light stabilizers, surface treatment agents, antioxidants, antiaging agents, crosslinking promoters, polymerization inhibitors, plasticizers, preservatives, pH adjusting agents, defoaming agents, moisture-keeping agents, and the like.

Preferably the light-curable inkjet printing ink composition proposed by the present invention, as obtained from the aforementioned materials, has a flash point of 70° C. or above when measured using a Seta closed flash point measuring apparatus according to a method conforming to JIS K2265. When it has such flash point, the ink composition proposed by the present invention qualifies as a flammable liquid of category 4 under the GHS, and thus becomes very safe owing to its low flammability, etc.

It should be added that, while it can contain a solvent, the light-curable inkjet printing ink composition proposed by the present invention is preferably solvent-free, and when it is solvent-free, the viscosity at preferably 25° C. is 100 mPa·s or lower, or more preferably 20 mPa·s or lower, or even more preferably 10 mPa·s or lower. Furthermore, the light-curable inkjet printing ink composition can be designed to have a specific viscosity suitable for each inkjet system.

It should be noted that, in this Specification, "viscosity" refers to a viscosity measured with a Type E viscometer (product name: RE100L Viscometer, manufactured by Toki Sangyo) under the conditions of 25° C. and 20 rpm.

As it contains the specific light-polymerizable component and acylphosphine oxide-based light-polymerization initiator mentioned above by specific quantities, the light-curable inkjet printing ink composition proposed by the present invention can be made to demonstrate excellent properties in all aspects, such as excellent curability under ultraviolet light, particularly ultraviolet light from a light-emitting diode (LED) light source, good adhesion and scratch resistance to/against the base material which can be a floor material, vinyl chloride, polycarbonate, etc., excellent discharge stability and storage stability, and safety such as high flash point, flexibility, low skin irritability, and low odor.

The method for preparing the ink composition proposed by the present invention is not limited in any way, and it can be prepared by adding all of the aforementioned materials together and mixing them in a bead mill, triple roll mills, etc.

It should be noted that the ink composition can also be prepared by obtaining a concentrated base ink beforehand by mixing the pigment, pigment dispersant, and light-polymerizable component, and then adding to this concentrated base ink the light-polymerizable component, light-polymerization initiator, and other additives such as surface-active agent as necessary, to a desired formulation of light-curable inkjet printing ink composition.

For the base material on which to print the ink composition proposed by the present invention, a floor material, vinyl chloride, polyethylene terephthalate, polycarbonate, etc., are preferred; however, the ink composition can be printed, without problem, on any base material traditionally used for printing with light-curable inkjet printing ink compositions (paper, plastic film, capsule, gel, metal foil, glass, fabric, etc.).

The specific method for printing and curing the ink composition proposed by the present invention is a method of discharging the ink composition proposed by the present invention onto a base material through an inkjet head, and then exposing to light and thereby curing the coating film formed by the ink composition proposed by the present invention that has landed on the base material.

For example, its discharge onto the base material (printing of images) can be achieved by supplying the ink composition proposed by the present invention to an inkjet recording printer head that supports low viscosity and then discharging the ink composition from the printer head onto the base material to a coating film thickness of 1 to 60 μm, for example. Also, its exposure to light and curing (curing of images) can be achieved by irradiating light onto the coating film of the ink composition proposed by the present invention that has been applied to the base material as images.

For the inkjet recording printer with which to print the ink composition proposed by the present invention, any traditionally used inkjet recording printer can be used. It should be noted that, if a continuous-type inkjet recording printer is used, a conductivity additive is also added to the ink composition proposed by the present invention to adjust the conductivity.

The light source used for curing the coating film may be ultraviolet light (UV), ultraviolet light (light-emitting diode (LED)), electron beam, visible light, etc.; due to environmental considerations, however, a light-emitting diode (LED) that generates ultraviolet light whose emission peak wavelength is in a range of 350 to 420 nm is preferred.

EXAMPLES

Examples 1 to 18 and Comparative Examples 1 to 5

Preparation of Light-Curable Inkjet Printing Ink Composition

The present invention is explained in greater detail below by citing examples; however, the present invention is not limited to these examples. It should be noted that, unless otherwise specified, "%" means "percent by mass," while "part" means "part by mass."

The following materials were used in the Examples and Comparative Examples below.
<Pigment Dispersant>
Solsperse 32000 (manufactured by Lubrizol)
<Light-Polymerizable Component: (A) Monofunctional Monomers Whose Homopolymer has a Glass Transition Temperature of 20° C. or Above>
Acryloyl morpholine (Product name: ACMO, manufactured by KJ Chemicals)
N-vinyl caprolactam (Product name: V-CAP, manufactured by ISP Japan)
Isobornyl acrylate (Product name: IBXA, manufactured by Osaka Organic Chemical Industry)
Cyclic trimethylol propane formal acrylate (Product name: Viscoat #200, manufactured by Osaka Organic Chemical Industry)
<Light-Polymerizable Component: (B) Monofunctional Monomers Whose Homopolymer has a Glass Transition Temperature of Below 20° C.>
2-phenoxy ethyl acrylate (Product name: SR339A, manufactured by Sartomer)
Benzyl acrylate (Product name: Viscoat #160, manufactured by Osaka Organic Chemical Industry)
Tetrahydrofurfuryl acrylate (Product name: SR285, manufactured by Sartomer)
Ethyl carbitol acrylate (Product name: Viscoat #190, manufactured by Osaka Organic Chemical Industry)
<Light-Polymerizable Component: Other Monomers>
1,6-hexane diol diacrylate (Product name: Viscoat #230, manufactured by Osaka Organic Chemical Industry)
Trimethylol propane triacrylate (Product name: Viscoat #295, manufactured by Osaka Organic Chemical Industry)
<Colorants (Pigments)>
Special Black 350 (Black pigment, manufactured by Orion Engineered Carbons)
Novoperm Yellow P-HG (Yellow pigment, manufactured by Clariant)
Heliogen Blue D7110F (Cyan pigment, manufactured by BASF)
FASTOGEN Super Magenta RTS (Magenta pigment, manufactured by DIC)
JR-800 (White pigment, manufactured by Tayca)
<Light-Polymerization Initiator>
TPO: 2,4,6-trimethyl benzoyl-diphenyl-phosphine oxide (Manufactured by Lambson)
<Sensitizer>
DETX: 2,4-diethyl thioxanthone (Manufactured by Lambson)
<Surface-Active Agent>
BYK-UV3500 (Polyether-modified polydimethyl siloxane having an acrylic functional group, manufactured by BYK)

<Black Ink Composition>

A mixture prepared by blending a pigment (Special Black 350), a pigment dispersant (Solsperse 32000), and a light-polymerizable component (benzyl acrylate in Examples 1 to 4, 6 to 9, and 11 to 14, 2-phenoxy ethyl acrylate in Example 5, and ethyl carbitol acrylate in Example 10), at a blending ratio (ratio by mass) of 16/6/78, was dispersed in an Eiger mill (using zirconium beads of 0.5 mm in diameter as a medium) to obtain a black concentrated base.

Each component was added to the obtained black concentrated base according to the applicable blending composition (percent by mass) in Tables 1 and 2, after which the concentrated base was mixed under agitation to obtain the light-curable inkjet printing black ink compositions in Examples 1 to 14 and Comparative Examples 1 to 5.

<Yellow Ink Composition>

A mixture prepared by blending a pigment (Novoperm Yellow P-HG), a pigment dispersant (Solsperse 32000), and a light-polymerizable component (benzyl acrylate), at a blending ratio (ratio by mass) of 20/8/72, was dispersed in an Eiger mill (using zirconium beads of 0.5 mm in diameter as a medium) to obtain a yellow concentrated base.

Each component was added to the obtained yellow concentrated base according to the applicable blending composition (percent by mass) in Table 1, after which the concentrated base was mixed under agitation to obtain the light-curable inkjet printing yellow ink composition in Example 15.

<Cyan Ink Composition>

A mixture prepared by blending a pigment (Heliogen Blue D7110F), a pigment dispersant (Solsperse 32000), and a light-polymerizable component (benzyl acrylate), at a blending ratio (ratio by mass) of 16/6/78, was dispersed in an Eiger mill (using zirconium beads of 0.5 mm in diameter as a medium) to obtain a cyan concentrated base.

Each component was added to the obtained cyan concentrated base according to the applicable blending composition (percent by mass) in Table 1, after which the concentrated base was mixed under agitation to obtain the light-curable inkjet printing cyan ink composition in Example 16.

<Magenta Ink Composition>

A mixture prepared by blending a pigment (FASTOGEN Super Magenta RTS), a pigment dispersant (Solsperse 32000), and a light-polymerizable component (benzyl acrylate), at a blending ratio (ratio by mass) of 24/10/66, was dispersed in an Eiger mill (using zirconium beads of 0.5 mm in diameter as a medium) to obtain a magenta concentrated base.

Each component was added to the obtained magenta concentrated base according to the applicable blending composition (percent by mass) in Table 1, after which the concentrated base was mixed under agitation to obtain the light-curable inkjet printing magenta ink composition in Example 17.

<White Ink Composition>

A mixture prepared by blending a pigment (JR-800), a pigment dispersant (Solsperse 32000), and a light-polymerizable component (benzyl acrylate), at a blending ratio (ratio by mass) of 40/3/57, was dispersed in an Eiger mill (using zirconium beads of 0.5 mm in diameter as a medium) to obtain a white concentrated base.

Each component was added to the obtained white concentrated base according to the applicable blending composition (percent by mass) in Table 1, after which the concentrated base was mixed under agitation to obtain the light-curable inkjet printing white ink composition in Example 18.

[Viscosity Measurement of Ink Compositions]

The light-curable inkjet printing ink compositions obtained in Examples 1 to 18 and Comparative Examples 1 to 5 were measured for viscosity using a Type E viscometer (product name: RE100L Viscometer, manufactured by Toki Sangyo) under the conditions of 25° C. in temperature and 20 rpm in rotor speed. The results are shown in Tables 1 and 2.

[Performance Evaluation of Ink Compositions]

The light-curable inkjet printing ink compositions obtained in Examples 1 to 18 and Comparative Examples 1 to 5 were applied onto PVC80 (manufactured by Lintec) using a #4 bar coater. Next, the ink compositions were cured using a UV-LED lamp manufactured by Phoseon Technology.

Curability with a UV-LED lamp, adhesion, and flexibility were evaluated using the methods explained below. The results are shown in Tables 1 and 2.

(LED Curability)

The ink-applied surface was irradiated with a UV-LED lamp manufactured by Phoseon Technology from 2 cm away under the condition of 1 second per irradiation (for a total UV light quantity of 60 mJ/cm$^2$ per second), and LED curability was evaluated based on the number of irradiations needed until the tackiness of the surface disappeared.

(Adhesion)

A cutting knife was used to cross-cut the coating film of each ink composition that had been cured until the tackiness of the surface disappeared, after which a clear adhesive tape was adhered onto and then peeled from the cross-cuts, and adhesion was evaluated based on the degree of peeling of the cured coating film according to the standards below:

○: The cured coating film did not peel.

Δ: The cured coating film peeled by less than 20% of the total area.

X: The cured coating film peeled by 20% or more of the total area.

(Flexibility)

The material on which each ink composition had been applied and then cured until the tackiness of the surface disappeared, was bent, and cracking of the cured coating film was evaluated according to the standards below:

○: The cured coating film did not crack.

X: The cured coating film cracked.

TABLE 1

| Composition | | | Examples Black | | | | | | | |
|---|---|---|---|---|---|---|---|---|---|---|
| | | | 1 | 2 | 3 | 4 | 5 | 6 | 7 | 8 |
| Light-polymerizable component | (A) Monofunctional high-Tg monomer | Acryloyl morpholine (Tg = 145° C.) | 10.0 | 10.0 | 20.0 | 10.0 | 10.0 | 10.0 | 10.0 | 10.0 |
| | | N-vinyl caprolactam (Tg = 90° C.) | 10.0 | 10.0 | 10.0 | 20.0 | 10.0 | 10.0 | 10.0 | 10.0 |
| | | Isobornyl acrylate (Tg = 97° C.) | 10.0 | — | — | — | 10.0 | 10.0 | 10.0 | 10.0 |
| | | Cyclic trimethylol propane formal acrylate (Tg = 27° C.) | — | 10.0 | — | — | — | — | — | — |

TABLE 1-continued

| | | | | | | | | | | |
|---|---|---|---|---|---|---|---|---|---|---|
| (B) Monofunctional low-Tg monomer | 2-phenoxy ethyl acrylate (Tg = 5° C.) | — | — | — | — | 56.3 | — | — | — |
| | Benzyl acrylate (Tg = 6° C.) | 56.3 | 56.3 | 56.3 | 56.3 | — | 51.3 | 51.3 | 54.3 |
| | Tetrahydrofurfuryl acrylate (Tg = −12° C.) | — | — | — | — | — | 5.0 | — | — |
| | Ethyl carbitol acrylate (Tg = −67° C.) | — | — | — | — | — | — | 5.0 | — |
| Other monomers | 1,6-hexane diol diacrylate | — | — | — | — | — | — | — | 2.0 |
| | Trimethylol propane triacrylate | — | — | — | — | — | — | — | — |
| Colorant (pigment) | Special Black 350 | 1.6 | 1.6 | 1.6 | 1.6 | 1.6 | 1.6 | 1.6 | 1.6 |
| | Novoperm Yellow P-HG | — | — | — | — | — | — | — | — |
| | Heliogen Blue D7110F | — | — | — | — | — | — | — | — |
| | FASTOGEN Super Magenta RTS | — | — | — | — | — | — | — | — |
| | JR-800 | — | — | — | — | — | — | — | — |
| Pigment dispersant | Solsperse 32000 | 0.6 | 0.6 | 0.6 | 0.6 | 0.6 | 0.6 | 0.6 | 0.6 |
| Light-polymerization initiator | TPO | 7.0 | 7.0 | 7.0 | 7.0 | 7.0 | 7.0 | 7.0 | 7.0 |
| Sensitizer | DETX | 4.0 | 4.0 | 4.0 | 4.0 | 4.0 | 4.0 | 4.0 | 4.0 |
| Surface active agent | BYK-UV3500 | 0.5 | 0.5 | 0.5 | 0.5 | 0.5 | 0.5 | 0.5 | 0.5 |
| | Total ink composition (parts by mass) | 100.0 | 100.0 | 100.0 | 100.0 | 100.0 | 100.0 | 100.0 | 100.0 |
| | Percentage of (A) in polymerizable component (% by mass) | 34.8 | 34.8 | 34.8 | 34.8 | 34.8 | 34.8 | 34.8 | 34.8 |
| | Percentage of (B) in polymerizable component (% by mass) | 65.2 | 65.2 | 65.2 | 65.2 | 65.2 | 65.2 | 65.2 | 62.9 |
| | Total percentage of (A) + (B) in polymerizable component (% by mass) | 100.0 | 100.0 | 100.0 | 100.0 | 100.0 | 100.0 | 100.0 | 97.7 |
| | (1) Viscosity of ink composition (mPa · s, 25° C.) | 7.0 | 8.2 | 10.3 | 6.5 | 11.1 | 7.3 | 7.2 | 7.3 |
| | (2) Curability of ink composition (Number of 60-mJ/cm² irradiations) | 1 | 1 | 1 | 1 | 1 | 1 | 1 | 1 |
| | (3) Adhesion of cured film | ○ | ○ | ○ | ○ | ○ | ○ | ○ | ○ |
| | (4) Flexibility of cured film | ○ | ○ | ○ | ○ | ○ | ○ | ○ | ○ |

| | | | Examples Black | | | | | |
|---|---|---|---|---|---|---|---|---|
| Composition | | | 9 | 10 | 11 | 12 | 13 | 14 |
| Light-polymerizable component | (A) Monofunctional high-Tg monomer | Acryloyl morpholine (Tg = 145° C.) | 10.0 | 15.0 | 5.0 | 10.0 | 15.0 | 10.0 |
| | | N-vinyl caprolactam (Tg = 90° C.) | 10.0 | 20.0 | 5.0 | 10.0 | 15.0 | 10.0 |
| | | Isobornyl acrylate (Tg = 97° C.) | 10.0 | 25.0 | 25.0 | 10.0 | 15.0 | 10.0 |
| | | Cyclic trimethylol propane formal acrylate (Tg = 27° C.) | — | 10.0 | 25.0 | — | — | — |
| | (B) Monofunctional low-Tg monomer | 2-phenoxy ethyl acrylate (Tg = 5° C.) | — | — | — | — | — | — |
| | | Benzyl acrylate (Tg = 6° C.) | 54.3 | — | 26.3 | 43.3 | 11.3 | 19.3 |
| | | Tetrahydrofurfuryl acrylate (Tg = −12° C.) | — | — | — | — | — | — |
| | | Ethyl carbitol acrylate (Tg = −67° C.) | — | 16.3 | — | — | 25.0 | 15.0 |
| Other monomers | | 1,6-hexane diol diacrylate | — | — | — | 13.0 | — | 22.0 |
| | | Trimethylol propane triacrylate | 2.0 | — | — | — | 5.0 | — |
| Colorant (pigment) | | Special Black 350 | 1.6 | 1.6 | 1.6 | 1.6 | 1.6 | 1.6 |
| | | Novoperm Yellow P-HG | — | — | — | — | — | — |
| | | Heliogen Blue D7110F | — | — | — | — | — | — |
| | | FASTOGEN Super Magenta RTS | — | — | — | — | — | — |
| | | JR-800 | — | — | — | — | — | — |
| Pigment dispersant | | Solsperse 32000 | 0.6 | 0.6 | 0.6 | 0.6 | 0.6 | 0.6 |
| Light-polymerization initiator | | TPO | 7.0 | 7.0 | 7.0 | 7.0 | 7.0 | 7.0 |
| Sensitizer | | DETX | 4.0 | 4.0 | 4.0 | 4.0 | 4.0 | 4.0 |
| Surface active agent | | BYK-UV3500 | 0.5 | 0.5 | 0.5 | 0.5 | 0.5 | 0.5 |
| | | Total ink composition (parts by mass) | 100.0 | 100.0 | 100.0 | 100.0 | 100.0 | 100.0 |
| | | Percentage of (A) in polymerizable component (% by mass) | 34.8 | 81.1 | 69.5 | 34.8 | 52.1 | 34.8 |
| | | Percentage of (B) in polymerizable component (% by mass) | 62.9 | 18.9 | 30.5 | 50.2 | 42.1 | 39.7 |
| | | Total percentage of (A) + (B) in polymerizable component (% by mass) | 97.7 | 100.0 | 100.0 | 84.9 | 94.2 | 74.5 |
| | | (1) Viscosity of ink composition (mPa · s, 25° C.) | 7.5 | 15.0 | 13.0 | 8.1 | 10.2 | 12.5 |
| | | (2) Curability of ink composition (Number of 60-mJ/cm² irradiations) | 1 | 1 | 1 | 1 | 1 | 1 |
| | | (3) Adhesion of cured film | ○ | ○ | ○ | ○ | ○ | ○ |
| | | (4) Flexibility of cured film | ○ | ○ | ○ | ○ | ○ | ○ |

TABLE 2

| | | | Examples | | | | Comparative Examples | | | | |
|---|---|---|---|---|---|---|---|---|---|---|---|
| | | | Yellow | Cyan | Magenta | White | Black | | | | |
| Composition | | | 15 | 16 | 17 | 18 | 1 | 2 | 3 | 4 | 5 |
| Light-polymerizable component | (A) Monofunctional high-Tg monomer | Acryloyl morpholine (Tg = 145° C.) | 10.0 | 10.0 | 10.0 | 10.0 | 28.8 | — | 5.0 | 10.0 | 10.0 |
| | | N-vinyl caprolactam (Tg = 90° C.) | 10.0 | 10.0 | 10.0 | 10.0 | 25.0 | — | 5.0 | 10.0 | 10.0 |
| | | Isobornyl acrylate (Tg = 97° C.) | 10.0 | 10.0 | 10.0 | 10.0 | 25.0 | — | — | 10.0 | 10.0 |
| | | Cyclic trimethylol propane formal acrylate (Tg = 27° C.) | — | — | — | — | — | — | — | — | — |

TABLE 2-continued

|  |  | Examples | | | | Comparative Examples | | | | |
|---|---|---|---|---|---|---|---|---|---|---|
|  |  | Yellow | Cyan | Magenta | White | Black | | | | |
| Composition | | 15 | 16 | 17 | 18 | 1 | 2 | 3 | 4 | 5 |
| (B) Monofunctional low-Tg monomer | 2-phenoxy ethyl acrylate (Tg = 5° C.) | — | — | — | — | — | 10.0 | — | — | — |
| | Benzyl acrylate (Tg = 6° C.) | 55.7 | 58.3 | 57.1 | 45.9 | 7.5 | 76.3 | 76.3 | 26.3 | 21.3 |
| | Tetrahydrofurfuryl acrylate (Tg = −12° C.) | — | — | — | — | — | — | — | — | — |
| | Ethyl carbitol acrylate (Tg = −67° C.) | — | — | — | — | — | — | — | — | — |
| Other monomers | 1,6-hexane diol diacrylate | — | — | — | — | — | — | — | 30.0 | 15.0 |
| | Trimethylol propane triacrylate | — | — | — | — | — | — | — | — | 15.0 |
| Colorant (pigment) | Special Black 350 | — | — | — | — | 1.6 | 1.6 | 1.6 | 1.6 | 1.6 |
| | Novoperm Yellow P-HG | 2.0 | — | — | — | — | — | — | — | — |
| | Heliogen Blue D7110F | — | 1.6 | — | — | — | — | — | — | — |
| | FASTOGEN Super Magenta RTS | — | — | 2.4 | — | — | — | — | — | — |
| | JR-800 | — | — | — | 8.0 | — | — | — | — | — |
| Pigment dispersant | Solsperse 32000 | 0.8 | 0.6 | 1.0 | 0.6 | 0.6 | 0.6 | 0.6 | 0.6 | 0.6 |
| Light-polymerization initiator | TPO | 7.0 | 7.0 | 7.0 | 15.0 | 7.0 | 7.0 | 7.0 | 7.0 | 7.0 |
| Sensitizer | DETX | 4.0 | 2.0 | 2.0 | — | 4.0 | 4.0 | 4.0 | 4.0 | 4.0 |
| Surface active agent | BYK-UV3500 | 0.5 | 0.5 | 0.5 | 0.5 | 0.5 | 0.5 | 0.5 | 0.5 | 0.5 |
| Total ink composition (parts by mass) | | 100.0 | 100.0 | 100.0 | 100.0 | 100.0 | 100.0 | 100.0 | 100.0 | 95.0 |
| Percentage of (A) in polymerizable component (% by mass) | | 35.0 | 34.0 | 34.4 | 39.5 | 91.3 | 0.0 | 11.6 | 34.8 | 36.9 |
| Percentage of (B) in polymerizable component (% by mass) | | 65.0 | 66.0 | 65.6 | 60.5 | 8.7 | 100.0 | 88.4 | 30.5 | 26.2 |
| Total percentage of (A) + (B) in polymerizable component (% by mass) | | 100.0 | 100.0 | 100.0 | 100.0 | 100.0 | 100.0 | 100.0 | 65.2 | 63.1 |
| (1) Viscosity of ink composition (mPa · s, 25° C.) | | 7.2 | 7.1 | 7.3 | 7.8 | 15.3 | 4.5 | 6.0 | 9.5 | 11.5 |
| (2) Curability of ink composition (Number of 60-mJ/cm² irradiations) | | 1 | 1 | 1 | 1 | 1 | 2 | 2 | 1 | 1 |
| (3) Adhesion of cured film | | ○ | ○ | ○ | ○ | ○ | X | ○ | X | X |
| (4) Flexibility of cured film | | ○ | ○ | ○ | ○ | X | ○ | ○ | X | X |

Judging from the results shown in Tables 1 and 2 above, Examples 1 to 18 of the light-curable inkjet printing ink compositions proposed by the present invention exhibit excellent LED curability, adhesion, and flexibility of the coating film of ink.

Turning to the results of the Comparative Examples shown in Table 2, however, Comparative Example 1 characterized by an excessive content of (A) resulted in poor flexibility. Comparative Example 2 characterized by zero content of (A) resulted in poor curability and adhesion. Comparative Example 3 characterized by an insufficiency of (A) and an excessive content of (B) resulted in poor curability. Comparative Examples 4 and 5 characterized by an insufficiency of (A) and (B) as a total, resulted in poor adhesion and flexibility.

These results reveal that, by providing a light-curable inkjet printing ink composition of a specific formation, the present invention achieves the effects of excellent LED curability as well as excellent adhesion and flexibility of the cured film.

What is claimed is:

1. A light-curable inkjet printing ink composition that contains a light-polymerizable component and a light-polymerization initiator, wherein:
   all light-polymerizable components contained in the light-curable inkjet printing ink composition consist of:
   (A) a monofunctional monomer whose homopolymer has a glass transition temperature of 20° C. or above; and
   (B) a monofunctional monomer whose homopolymer has a glass transition temperature of below 20° C.;
   wherein (A) is contained by 30 to 90 percent by mass, and (B) is contained by 10 to 70 percent by mass, relative to the total mass of all the light-polymerizable component,
   (B) contains at least one of ethyl carbitol acrylate or tetrahydrofurfuryl acrylate by 0 to 30 percent by mass, relative to the total mass of all the light-polymerizable components, and
   (A) and (B) account for 100 percent by mass of the total mass of all the light-polymerizable components.

2. The light-curable inkjet printing ink composition according to claim 1, wherein (A) is one or more of acrylamide monomer, N-vinyl caprolactam, cyclic trimethylol propane formal acrylate, and isobornyl acrylate.

3. The light-curable inkjet printing ink composition according to claim 1, wherein (A) contains an acrylamide monomer and a N-vinyl caprolactam, and the acrylamide monomer is contained by 5 percent by mass or more, and the N-vinyl caprolactam is contained by 5 percent by mass or more, relative to the total mass of the light-polymerizable component.

4. The light-curable inkjet printing ink composition according to claim 1, wherein (B) is one or more of benzyl acrylate, 2-phenoxy ethyl acrylate, ethylene oxide-added monomer of 2-phenoxy ethyl acrylate, cyclohexyl acrylate, ethyl carbitol acrylate and tetrahydrofurfuryl acrylate.

5. An inkjet printing method that uses the light-curable inkjet printing ink composition according to claim 1, comprising attaching the light-curable inkjet printing ink composition to a recording medium, and irradiating the attached light-curable inkjet printing ink composition with ultraviolet light, from a light-emitting diode light source, having an emission peak wavelength in a range of 350 to 420 nm.

6. The light-curable inkjet printing ink composition according to claim 2, wherein (A) contains an acrylamide monomer and a N-vinyl caprolactam, and the acrylamide monomer is contained by 5 percent by mass or more, and the N-vinyl caprolactam is contained by 5 percent by mass or more, relative to the total mass of the light-polymerizable component.

7. The light-curable inkjet printing ink composition according to claim 2, wherein (B) is one or more of benzyl acrylate, 2-phenoxy ethyl acrylate, ethylene oxide-added monomer of 2-phenoxy ethyl acrylate, cyclohexyl acrylate, ethyl carbitol acrylate and tetrahydrofurfuryl acrylate.

8. An inkjet printing method that uses the light-curable inkjet printing ink composition according to claim 2, comprising attaching the light-curable inkjet printing ink composition to a recording medium, and irradiating the attached light-curable inkjet printing ink composition with ultraviolet light, from a light-emitting diode light source, having an emission peak wavelength in a range of 350 to 420 nm.

9. The light-curable inkjet printing ink composition according to claim 3, wherein (B) is one or more of benzyl acrylate, 2-phenoxy ethyl acrylate, ethylene oxide-added monomer of 2-phenoxy ethyl acrylate, cyclohexyl acrylate, ethyl carbitol acrylate and tetrahydrofurfuryl acrylate.

10. An inkjet printing method that uses the light-curable inkjet printing ink composition according to claim 3, comprising attaching the light-curable inkjet printing ink composition to a recording medium, and irradiating the attached light-curable inkjet printing ink composition with ultraviolet light, from a light-emitting diode light source, having an emission peak wavelength in a range of 350 to 420 nm.

11. An inkjet printing method that uses the light-curable inkjet printing ink composition according to claim 4, comprising attaching the light-curable inkjet printing ink composition to a recording medium, and irradiating the attached light-curable inkjet printing ink composition with ultraviolet light, from a light-emitting diode light source, having an emission peak wavelength in a range of 350 to 420 nm.

12. The light-curable inkjet printing ink composition according to claim 6, wherein (B) is one or more of benzyl acrylate, 2-phenoxy ethyl acrylate, ethylene oxide-added monomer of 2-phenoxy ethyl acrylate, cyclohexyl acrylate, ethyl carbitol acrylate and tetrahydrofurfuryl acrylate.

* * * * *